United States Patent
Ron

[11] 3,888,547
[45] June 10, 1975

[54] COMBINED POWER BRAKE AND ANTISKID ACTUATORS

[76] Inventor: Benjamin Ron, 10 Sanhedrin St., Tel-Aviv, Israel

[22] Filed: Apr. 3, 1972

[21] Appl. No.: 240,455

Related U.S. Application Data

[63] Continuation-in-part of Ser. No. 166,399, July 27, 1971, abandoned, which is a continuation-in-part of Ser. No. 80,899, Oct. 15, 1970, Pat. No. 3,751,919, which is a continuation-in-part of Ser. No. 34,143, May 4, 1970, abandoned.

[52] U.S. Cl. ............ 303/21 F; 60/551; 60/581; 188/345; 303/21 AF; 303/10
[51] Int. Cl. ............................................. B60t 8/06
[58] Field of Search ............... 303/21 F, 21 AF, 10; 188/345; 60/54.6 E

[56] References Cited
UNITED STATES PATENTS

| | | | |
|---|---|---|---|
| 2,815,502 | 12/1957 | Zeller | 60/54.6 E |
| 3,401,982 | 9/1968 | Walker et al. | 303/21 F |
| 3,486,801 | 12/1969 | Frayer | 303/21 F |
| 3,524,683 | 8/1970 | Stelzer | 303/21 F |
| 3,586,388 | 6/1971 | Stelzer | 303/21 F |
| 3,606,488 | 9/1971 | Beuchle et al. | 303/21 F |
| 3,659,905 | 5/1972 | Goulish | 303/21 F |

*Primary Examiner*—Robert J. Spar
*Assistant Examiner*—Donald W. Underwood
*Attorney, Agent, or Firm*—Samuel Shriber

[57] ABSTRACT

A combined Power Brake and Antiskid Actuators made of at least two hydraulically independent brake control valves which are simultaneously activateable by a single brake pedal through a mechanical differential linkage, at least one of these brake valves associated with remotely controlled means for modulating its pressure output.

6 Claims, 9 Drawing Figures

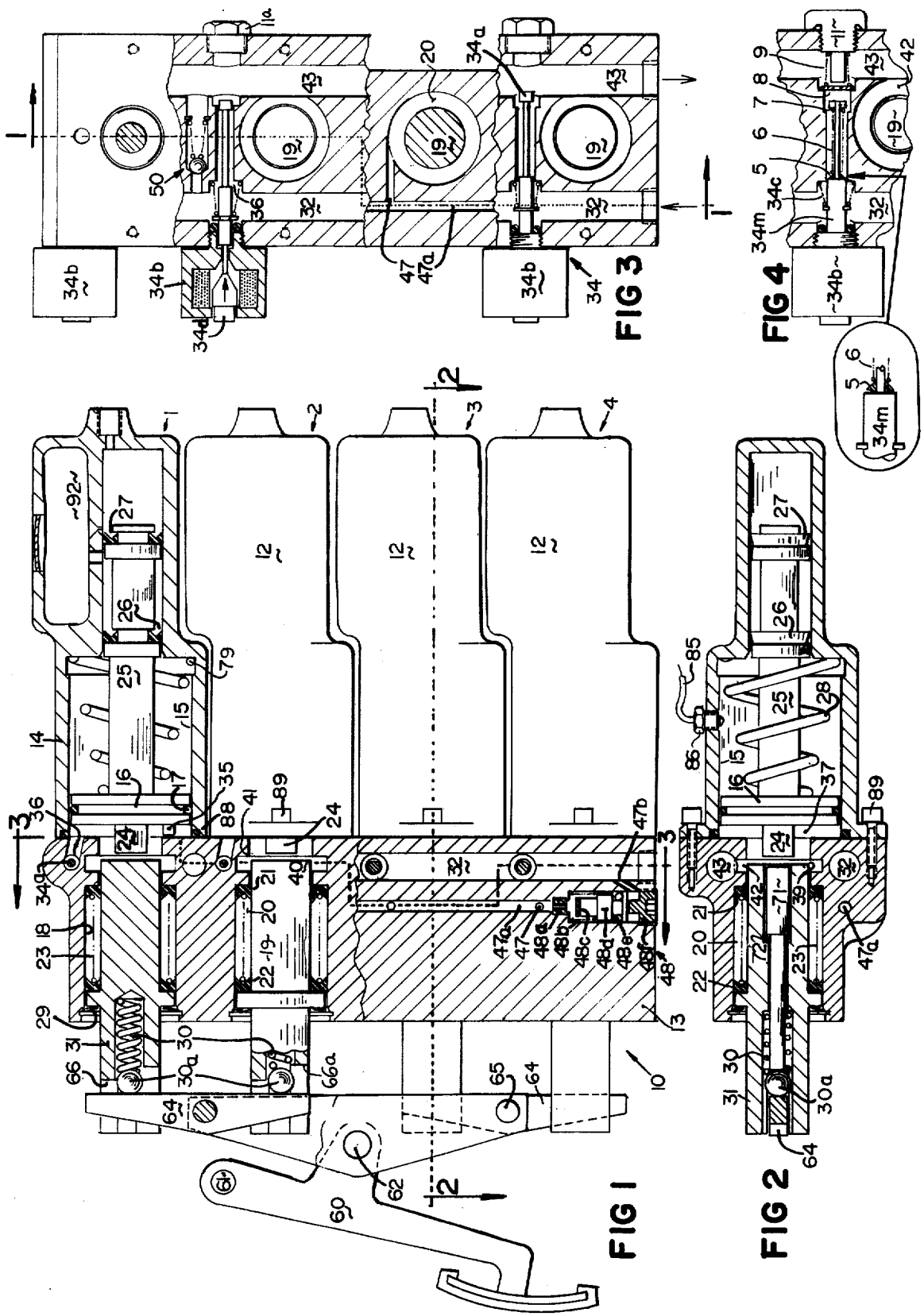

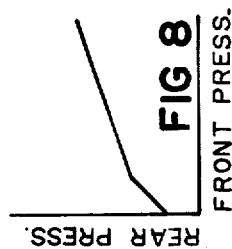
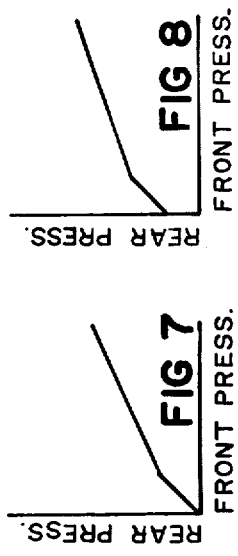
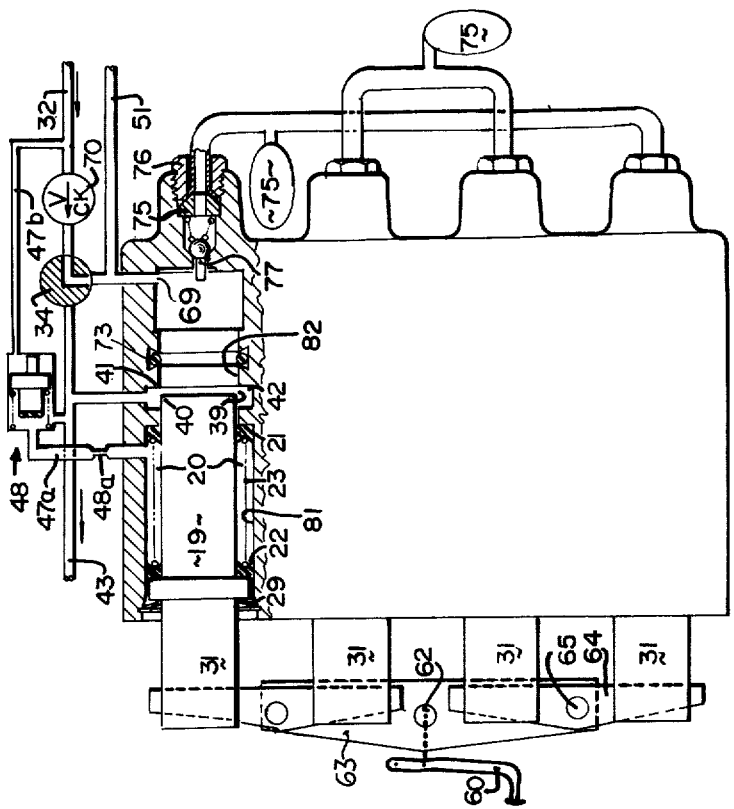
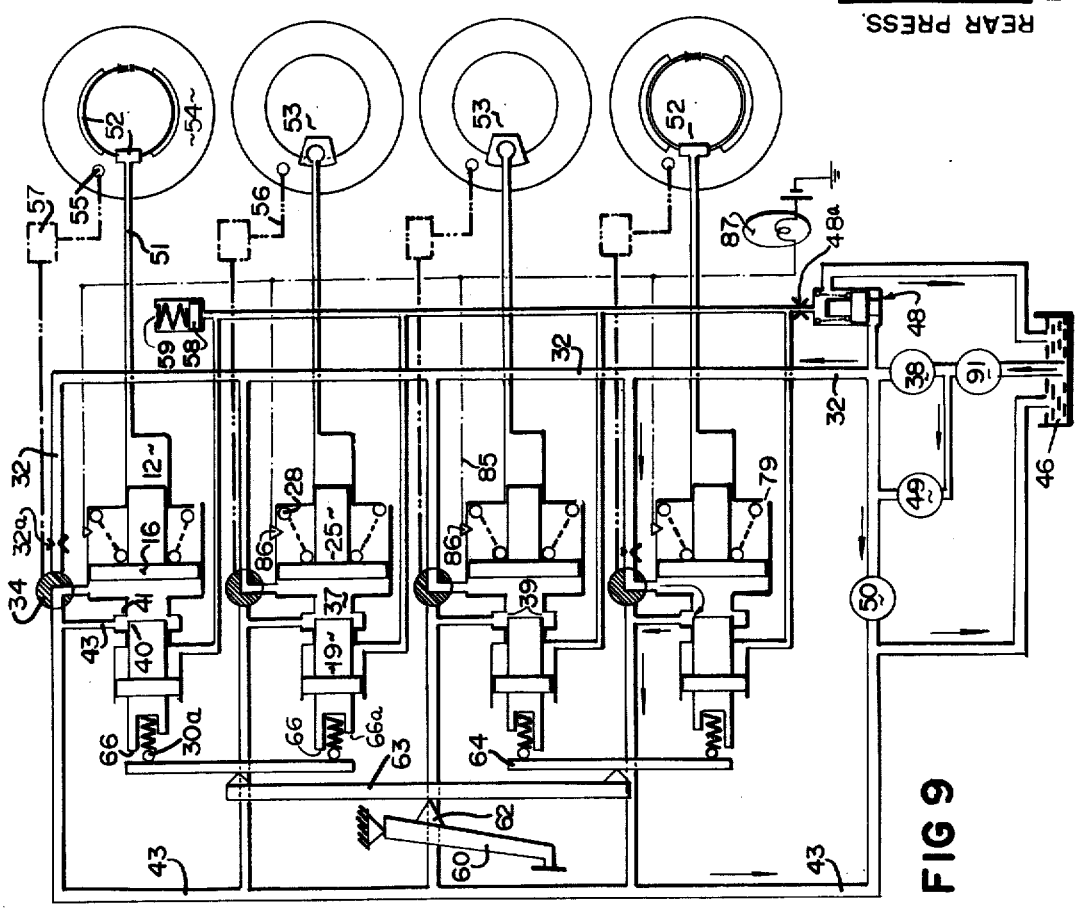

COMBINED POWER BRAKE AND ANTISKID ACTUATORS

CROSS REFERENCE TO OTHER APPLICATIONS:

This application is a continuation in part of my co-pending application, now abandoned, titled "Combined Hydraulic Power Brake and Antiskid Actuators" Ser. No. 166,399 filed on July 27, 1971, which is a continuation in part of my co-pending application "Hydraulic Power Brake Booster Motor" Ser. No. 80,899 filed on Oct. 15, 1970, now U.S. Pat. No. 3,751,919 which is a continuation in part of my application "Brake Booster Motor" Ser. No. 34,143 filed on May 4, 1970, now abandoned.

SUMMARY AND BACKGROUND

In a modern vehicle the operator can usually generate, through the brake system, sufficient braking torque to lock the vehicle's wheels. A moving vehicle with locked wheels has inferior directional stability and controlability, and it has been established that limiting the wheel's slip (slip is the ratio between vehicle's speed minus wheel's tangential speed divided by vehicles speed) can improve the vehicle's braking characteristics.

One approach to the design of such a system (these systems are often referred to as "Antiskid" or "Antilock" Systems) consists of three major sub-systems:

a. A wheel's monitoring unit, which monitors the wheel's behavior, often referred to as wheel's sensor, b. A logic, which receives and processes the information from the monitoring unit or units, and issues commands to actuators and, c. A brake line pressure modulating unit, or the actuators, which modulate the braking torque applied to the vehicle's wheels in order to limit the wheel's slip.

There are various approaches to the design of each of these sub-systems. The monitoring units and logic are often based on electronic hardware, while the actuators often include pneumatic, hydraulic, mechanical and electrical components.

Presently, a common approach to the design of a brake system which includes antiskid actuators is to have a standard service brake control for initially generating fluid pressure which is sent to a foundation brake through a brake line, to which an actuator is tied. The actuator responds to the logic's command by first isolating the foundation brake from the service brake control, and thereafter, collapsing the pressure in the foundation brake, and later restoring the pressure.

According to my invention, this redundancy is eliminated, and a single unit which generates the initial fluid pressure output in response to the operator's force input, thereafter modulates it in response to commands of the logic.

The Combined Power Brake and Antiskid Actuators comprises a plurality of brake control valves each having a servo fluid power input which may be utilized for generating fluid pressure output in response and relation to a force input applied by the operator at a brake pedal.

A first control means associated with the servo fluid power can collapse and allow the rebuild of the fluid pressure output from an individual brake control valve, and a second control valve can prevent a mechanical back-up means, which utilize the operator's force input to directly generate fluid pressure output, from overruling the first control means.

The brake control valve can be designed to contain one fluid medium for receiving the servo power and a separate fluid medium for transmitting the pressure output, or both media can be continious, utilizing a single fluid.

Therefore, additional objectives of this invention are;

To provide a Combined Power Brake and Antiskid Actuators capable of generating and modulating braking torque at the vehicle's foundation brakes in response to an operator's force input and commands of a suitable logic. Further, to show the required modifications to the hydraulic power brake booster shown in my applications, Ser. No. 80,899, to adapt it for the purpose of functioning as a brake control valve, being part of a Combined Power Brake and Antiskid Actuator.

The above, and other objectives of this invention, will become apparent from the following description taken in connection with the accompanying drawings, which form part of this specification and in which:

FIG. 1 is a side fragmentary sectioned view of a combined hydraulic power brake and antiskid actuators comprising four hydraulic power brake boosters, sectioned along the line 1—1 marked on FIG. 3, FIG. 2 shows a top view of the unit sectioned along the line 2—2 on FIG. 1, in which an optional modification of the reaction piston is shown, FIG. 3 shows a frontal cross-section view of this unit sectioned along the line 3—3 marked on FIG. 1, FIG. 4 shows optional modifications of the valving to effect the characteristics of the pressure collapse and rebuild in response to a logic's command, FIG. 5 shows a fragmentary sectioned, single fluid version of a combined hydraulic power brake and antiskid actuators, FIG. 6, 7 and 8 show some of the characteristics of front brake versus rear brake pressures obtainable from the hydraulic power brake, which may be especially desirable when the vehicle utilizing my invention is equipped with front disc foundation brake and rear drum foundation brake, and FIG. 9 shows a schematic layout of the unit shown in FIGS. 1, 2 and 3 shown with related hydraulic and control circuitry.

DETAILED DESCRIPTION OF THE FIGURES

In FIG. 1, 2, 3 and 9 similar parts will be given same numerals, and parts shown schematically in FIG. 9 will be given same numerals as corresponding parts which are described graphically in the other FIGS.

Referring now to FIGS. 1, 2, 3 and 9, it will be seen that a combined hydraulic power brake and antiskid actuators 10 comprises four substantially similar brake control valves 1, 2, 3 and 4 each including a booster attached to a master-cylinder 12, having a reservoir 92. To prevent over-crowding FIGURES, similar parts will be often identified only in one of the brake control valves.

The booster's housing is partially included in a valve body 13 common to the four boosters and is completed by an extension 14 of the master cylinder's body, which is attached to the valve body 13 by bolts 89 and sealed by a seal 88.

The booster's housing defines a first bore 15 in which a power piston 16 carrying a seal 17 is slideably disposed, and a second coaxial bore 18 in which a reaction piston 19 is slideably disposed.

The reaction piston 19 and the second bore 18 define an annular damper chamber 20 which contains lip seals 21 and 22 held in position by a helical compression spring 23. The chamber 20 is connected by a passage 47 to a passage 47a common to the four dampers, which contains at its lower end an orrifice 48a. Seal 21 allows slight flow under its lip into the damper chamber to permit initial fill-up of the damper chamber 20. The power piston 16 has a posterior extension 24 and an anterior extension 25 which carries lip seals 26 and 27 and serves as a master cylinder's primary piston. A helical compression return spring 28 urges the power piston 16 leftwards until its legs 35 abut against the valve body 13, and a finger spring washer 29 urges the reaction piston 19 rightwards. A helical compression spring 30 is disposed in a posterior extension 31 of the reaction piston 19.

Normally, servo fluid flow forced by a servo power source, preferably a pump 91, passes through a power steering gear 38, continues through hydraulic lines 32, through a first control means, valve 34, through a stepped inlet port 36 and into a variable volume 37 which is defined by the booster's housing and between the power piston 16 and the reaction piston 19.

The servo fluid flow exits from the variable volume through a peripheral variable restriction point 39 defined between an edge 40 of the reaction piston 19 and a lip 41 of a peripheral fluid collecting groove 42.

The servo fluid then enters the fluid collecting groove 42 which opens into a discharge passage 43 and which leads to a sump 46.

A pressure priority valve 49, preferably of the type which is disclosed in my co-pending application, Ser. No. 204,286, filed on Dec. 2, 1971, or an ordinary relief valve, limits the relief pressure across the power steering gear 38 and a relief valve 50 limits the pressure drop across the boosters.

The master cylinder 12 is connected via a brake line 51 to a hydraulically actuated foundation drum brake 52, or a hydraulically actuated foundation disc brake 53. The behavior of a wheel 54 is monitored by sensor 55 which forwards the information via wires 56 to a logic 57.

A brake pedal 60 is pivotly supported by a pin 61 and is pivotly connected to an arm 63 by a pin 62. The arm 63 pivotly supports arms 64 on pins 65. The arms 63 and 64 constitute a part of a differential linkage which distributes the brake pedal force input to the reaction pistons 19, according to its geometrical configuration. I will assume that boosters 2 and 3 serve the front wheels which are equipped with foundation disc brake 53 and boosters 1 and 4 serve the rear wheels of the car equipped with foundation drum brake 52. In such vehicles, the front wheels tend to lock before the rear wheels at low brake line pressure, on very slippery surfaces. Therefore it is desirable to initially delay the front wheel's brake pressure relative to the rear wheels' brake pressure, and as pressure is built-up, to a certain level, to start gradually delaying the rear brake pressure relative to the front wheels' brake pressure to prevent premature lock of the rear wheels due to their energization characteristics and due to dynamic weight shifts. In some present cars equipped with front disc brakes and rear drum brakes, these modifications of the front versus rear brake pressure characteristics are achieved by a "metering valve" and a "proportioning valve," respectively. In my invention the initial front brake pressure delay can be achieved by increasing the preload of the return springs 28 in the boosters that serve the front disc brakes, achieving the characteristics shown in FIG. 6. The relative front versus rear brake pressure characteristics shown in FIG. 7 can be achieved in my invention by the fact that initially the brake pedal 60 force input is transmitted from the small arms 64 to the reaction pistons 19 through the balls 30a and the springs 30, but when the brake pedal force reaches a certain level, the arms 64 establish mechanical contact with the reaction pistons 19 through a contact point 66, changing the differential linkage geometry and the ratio of brake pedal force input distribution between the reaction pistons transmitting larger part of any additional force input to the boosters serving the front brakes by elongating the vertical distance between the pin 65 and the point 66 which is defined on the piston 19 belonging to the brake valve 1 relative to the vertical distance between the pin 65 and the contact point 66 which relates to the brake valve 2 (similarly the force distribution between the lower pair of brake valves is changed to favour the brake valve 3 relative to the brake valve 4). The combination of the front versus rear brake pressure characteristics shown in FIGS. 6 and 7 yields the characteristics shown in FIG. 8.

When a power off condition, where no servo fluid power enters the boosters exists, the reaction piston 19 abuts against the power piston's posterior extension 24, and the boosters 1, 2, 3 and 4 accept work from the driver's foot through the differential linkage, rather than only force which they accepted during the power-on operation. Thus, during power-off operation the unit basically operates like conventional manual brake system, and obviously looses its ability to respond to the logic 57 signals coincides with a rupture of the brake line of the control valve 2, its reaction piston 19 will move all the way into the valve body 13 bringing a second contact point 66a into contact with the arm 64 thereby changing the differential geometry in order to increase the amount of force input to be transmitted to the control valve 1 which remains operative.

The increased force input to the boosters 2 and 3, discussed previously, results in higher pressures inside their variable volume, therefore larger part of the total flow passes through boosters 1 and 4, and can eventually result in flow stall in boosters 2 and 3. To prevent this some means of flow distribution is required, and a simple form thereof is to adjust the spools 34a of boosters 1 and 4 in their free position to restrict the flow entering into the variable volume 37 of boosters 1 and 4 relative to the flow entering the variable volume of booster 2 and 3. This restriction is indicated by numeral 32a on FIG. 9.

The above discussed modifications of front versus rear brake pressure may be beneficial in spite of the fact that a car is equipped with an antiskid system, since it will reduce the tendency of the car's wheels to enter excessive slip in the first place, reducing the dependency on the antiskid system.

I will briefly describe the operation of one of the four brake boosters: Normally servo fluid flows through the variable volume 37, in which the residual pressure is stabilized by a finger spring washer 29. When the brake pedal is depressed, the peripheral variable restriction 39 narrows, raising the pressure in the variable volume 37, sending the power piston 16 rightward, which in turn causes the application of the foundation brakes.

If the logic 57 determines that the brake torque is excessive, it activates solenoid 34b, causing a solenoid's plunger 34d to push the spool 34a rightwards, to the position shown in FIG. 3 booster 4, disconnecting the variable volume 37 from the line 32, stopping the servo fluid flow into it, and connecting it to the passage 43 bypassing the variable restriction point 39 and allowing quick dumping of the pressurized fluid from the variable volume 37 thereby releasing the brake.

The designer may prefer to use a two-way valve that only shuts the flow into the variable volume relaying on escapement of fluid from the variable volume through the restriction point 39, instead of the three-way valve 34 described above, to slow the pressure collapse.

When the logic 57 determines that the wheel has been sufficiently released the solenoid 34b is de-activated allowing the spring 34c to return the spool 34a and plunger 34d to their normal position shown in FIG. 3 booster 2, which permits re-application of the brake. The pressure collapse and rebuild can be further characterized by auxiliary means build around the spool 34a indicated by numeral 34m in its modified form shown in FIG. 4. Referring to FIG. 4, a conical washer 5 is slideable on the necked-down section of the spool, and is urged leftwards by a spring 6 which rests against the end-land 7. A washer 8 is urged leftwards by a spring 9 and is limited in its rightward movement by plug 11. These modifications do not effect the pressure build-up or collapse that is generated by a force input through the brake pedal 60, however, when the spool 34m is pushed rightwards by the solenoid plunger 34d while a relatively high pressure prevails in the variable volume 37, resulting flow through washer 8 will overcome the preload in the spring 9 and displace the washer against the plug 11 sealing thereby the washer's center hole, and the washer will move back leftwards only after the pressure in the variable volume 37 has collapsed to below a certain level, re-opening the washer's center hole, thereby rapidly collapsing the remaining pressure.

Therefore, the characteristics of collapsing a high pressure will include an initial rapid pressure drop which is permitted while the washer 8 is being displaced right-wards, thereafter this rate of pressure collapse will be slowed and become rapid again at the final stage. If the solenoid is activated while the prevailing pressure in the variable volume is relatively low, the washer 8 will not be displaced in the first place, thus, the entire pressure collapse will be rapid.

When the solenoid 34b is de-energized, the spool 34m is returned by the return spring 34c, however, the conical washer 5 is held in position by the pressure head in the line 32 and only when the pressure in the variable volume which is built by the restricted flow passing around the conical washer 5 is getting close to the pressure prevailing in line 32 can the spring 6 displace the conical washer leftwards. Thus, the pressure is rebuilt at a controlled rate after it has been collapsed by the logic. Either or both characterizations of pressure collapse, and pressure rebuild, can prove benefitial to achieve a smooth operation of the antiskid system.

The damper chamber 20, which normally serves to prevent the reaction piston from over-advancing in its bore 18 during a sudden brake application, also serves together with the second control means, i.e. valve 48, for blocking the reaction piston 19 from advancing toward the power piston 16 and pushing it mechanically.

Valve 48 comprising a spool 48d carrying a flat seal 48c and a seal 48e. Numeral 48f indicates a plug and numeral 47b communicates pressurized fluid from the line 32 into the volume underneath the spool 48d, thus, the spool 48d is pushed upwards, sealing the passage 47a with seal 48c, in a force dependent on the pressure prevailing in line 32. By properly sizing the cross-sectional area of the spool 48d it can be made to seal the damper chambers 20 during normal operation of the boosters, that is, if the rise in pressure in the line 32 is properly responsive to the input force at the brake pedal 60. However, it will allow the mechanical abutment of the reaction piston 19 against the power piston 16 when the input pressure from the brake pedal 60 does not generate the proper corresponding pressure at line 32. It is important to size the spool 48d so that when the pressure in line 32 is in the vicinity of the relief pressure of the valve 50 it will be well beyond the operator's physical ability to over-rule the valve 48 to prevent him from utilizing the mechanical back-up means for over-ruling the antiskid logic during a panic stop. As shown, one valve 48 can serve all the boosters simultaneously, although the designer may prefer equipping each booster with its own valve.

The seals' 21 and 22 elasticity allows slight forward movement of the reaction piston to further restrict the flow at the variable restriction 39, and this movement can be increased by backing the seals 21 and/or 22 with a wavey spring washer or by an arrangement shown in FIG. 9 including a piston 58 and a preloaded spring 59.

An optional modification of the mechanical back-up means which the power and reaction pistons in an abutting relationship comprise is shown in FIG. 2 (but is not shown in the other views of this unit) comprising a plunger 71 and a seal 72 which during power-off operation directly connect the ball 30a to the power piston 16 bypassing the spring 30, eliminating thereby part of the lost pedal travel. During power-on operation, the power piston is displaced rightward hydraulically thereby preventing the plunger 71 from abutting on the power piston 16.

A switch 86 activates a warning lamp 87 through wire 85 in response to excessive travel of the power piston 16.

The unit shown in FIGS. 1, 2, 3 and 9 utilizes a first fluid medium for receiving servo power into its boosters which operate in an open center mode, that is, the boosters are a part of a circuit through which fluid normally freely circulates and adapted to become restricted in response to force applied to the brake pedal 60, which in turn creates a pressure rise in the variable volume 37 etc., and a second fluid medium separated from the first fluid medium by a cavity vented through a hole 79 to the atmosphere, the second fluid medium connects the foundation brakes 52 and 53 to the master cylinders 12 which operate in a close center mode as typical conventional master cylinders do.

A simpler unit utilizing a single fluid medium for both functions is shown in FIG. 5 which shows a brake system control valve in which the peripheral fluid collection groove 42 divides an elongated bore to a first bore section 81 and a second bore section 82. The reaction piston 19 is normally disposed in the first bore 81 section but can be urged by the brake pedal 60 through the differential linkage comprising the arms 63 and 64 to advance towards the second bore section 82, restricting at the peripheral variable restriction 39 the entrance of a forced servo fluid flow into the peripheral fluid collecting groove 42, thereby raising the pressure in the second bore section 82.

The forced fluid flow normally enters the second bore section from a port 69 after passing a check valve 70 and the first control means, i.e., a three-way valve 34.

If an interruption occurs in the flow of the servo fluid into the second bore section 82, the brake pedal 60 can urge the reaction piston into the second bore section 82, sealing it from the peripheral collecting groove 42 by contacting a seal 73 and manually forcing fluid pressure output into the brake line 51, thereby changing the valves mode of operation from its normal open center mode to a closed center mode of operation.

By further advancement, the reaction piston pushes and thereby unseats a plunger 77 releasing pressurized fluid from an accumulator 75, which serves as a back-up servo fluid source, into the line 51.

The function of the second control means, i.e., damper chamber 20 and the normally open valve 48, are similar here to their function in the preferred embodiment.

Following are some of the considerations for preferring the design shown in FIGS. 1, 2, 3 and 9 or the simplified version shown in FIG. 5. The simplified version is more economical to manufacture and can be made physically smaller. However, it relies on a pump that can supply the full pressure required by the brake system, and on a fluid that will be compatible with the pump, the brake system, and if the same pump serves the power steering system, also with the power steering hardware.

On the other hand, the embodiment shown in FIGS. 1, 2, 3 and 9 can utilize one fluid, preferably brake fluid, in its master-cylinder, and suitable fluid, preferably oil in its booster section. Also, the pressure imposed on the fluid servo power source, i.e., pump 91, can be only a fraction of the fluid pressure output generated in the master-cylinder 12 with a suitable area ratio between the power and primary pistons. This can be a beneficial feature, especially where the hydraulic power brake is utilizing an existing power steering pump as a servo power source.

While this invention has been described and illustrated in connection with specific embodiments, it should be understood that various changes may be made in the form and details of the various parts of my invention without departure from its scope.

I claim:

1. A combined Power Brake and Antiskid Actuators comprising in combination;
    a. a brake pedal for accepting an operator's force and work inputs,
    b. a plurality of brake control valves each comprising,
        1. a housing defining a first and a second bore,
        2. a power piston slideable in said first bore.
        3. a reaction piston slideable in said second bore, being normally spaced from said power piston, and adapted to establish a mechanical abutment with said power piston after a certain relative movement therein between occurred,
        4. a passage for servo fluid flow leading through a variable volume defined between the power piston the reaction piston and the housing, and continuing through a variable restriction point defined between said reaction piston edge and a lip of a peripheral groove formed around said second bore,
    c. a mechanical differential linkage for distributing said force and work inputs between said reaction pistons,
    d. a control unit for sensing a skid condition and relaying a command to at least one of said brake control valves.
    e. a first control means for blocking said servo fluid flow from entering said variable volume of at least one of said brake control valves, in response to said command from a control unit
    f. a second control means for blocking said reaction piston from mechanically abutting against said power piston in response to the existence of a pressure in said servo fluid wherein, in response to said command from said control unit said first control means block the entrance of said servo fluid flow into said variable volume and open a passage between said variable volume and a return line for by-passing said restriction point and venting said variable volume.

2. A Combined Power Brake and Antiskid Actuators as in claim 1 where said second control means block the movement of said reaction piston beyond a certain allowable movement while said servo fluid flow power is available.

3. A Combined Power Brake and Antiskid Actuators as in claim 1 where said differential linkage contains spring means making it resilient up to a certain force input level.

4. A Combined Power Brake and Antiskid Actuators as in claim 1 where said force input is destributed between said brake control valves according to a first ratio up to a certain force input level, and any additional force input being distributed between said brake control valves according to a second ratio after a geometry change in the differential occurs.

5. A Combined Power Brake and Antiskid Actuators as in claim 1 where a flow restriction of the servo fluid flow entering the variable volume is provided to prevent stalling of other brake control valves, in whose variable volume a higher pressure prevails.

6. A Combined Power Brake and Antiskid Actuators as in claim 1 where dampening means are provided to dampen the movement of said reaction piston relative to said housing, said dampening means being blockable by said second control means to block the advancement of the reaction piston in said second bore.

* * * * *